United States Patent [19]

Dziubakowski et al.

[11] Patent Number: 4,742,284
[45] Date of Patent: May 3, 1988

[54] ADVANCED MOTOR CONTROLLER

[75] Inventors: Donald J. Dziubakowski, Seven Hills; Erik P. Kristoffersen, Cleveland Heights; Ronald J. Teer, Painesville, all of Ohio

[73] Assignee: The Babcock & Wilcox Company, New Orleans, La.

[21] Appl. No.: 940,137

[22] Filed: Dec. 9, 1986

[51] Int. Cl.[4] .............................................. G05B 5/01
[52] U.S. Cl. .................................... 318/624; 318/561
[58] Field of Search ............... 318/624, 561, 611, 624, 318/629, 619, 630, 631, 635

[56] References Cited

U.S. PATENT DOCUMENTS

| | | | |
|---|---|---|---|
| 3,961,234 | 6/1976 | Chambers | 318/624 X |
| 4,325,014 | 4/1982 | Jeck | 318/624 X |
| 4,335,341 | 6/1982 | Ogasawara | 318/624 |

Primary Examiner—B. Dobeck
Attorney, Agent, or Firm—Vytas R. Matas; Robert J. Edwards

[57] ABSTRACT

A controller for close positioning or modulating control of an electric motor is disclosed. The controller compares a signal representative of the demand on the system with a signal representative of the actual position of the motor or a valve associated therewith, and if the difference between the signals exceeds a "deadband" and no action has been taken within a first time interval, and if the last movement of the valve was in the same direction and a second time interval has elapsed, a motor run pulse is generated. If the last movement of the valve was in a direction opposite to that desired, the motor run pulse is extended to overcome "backlash" resulting from the reversal of motor rotation.

5 Claims, 1 Drawing Sheet

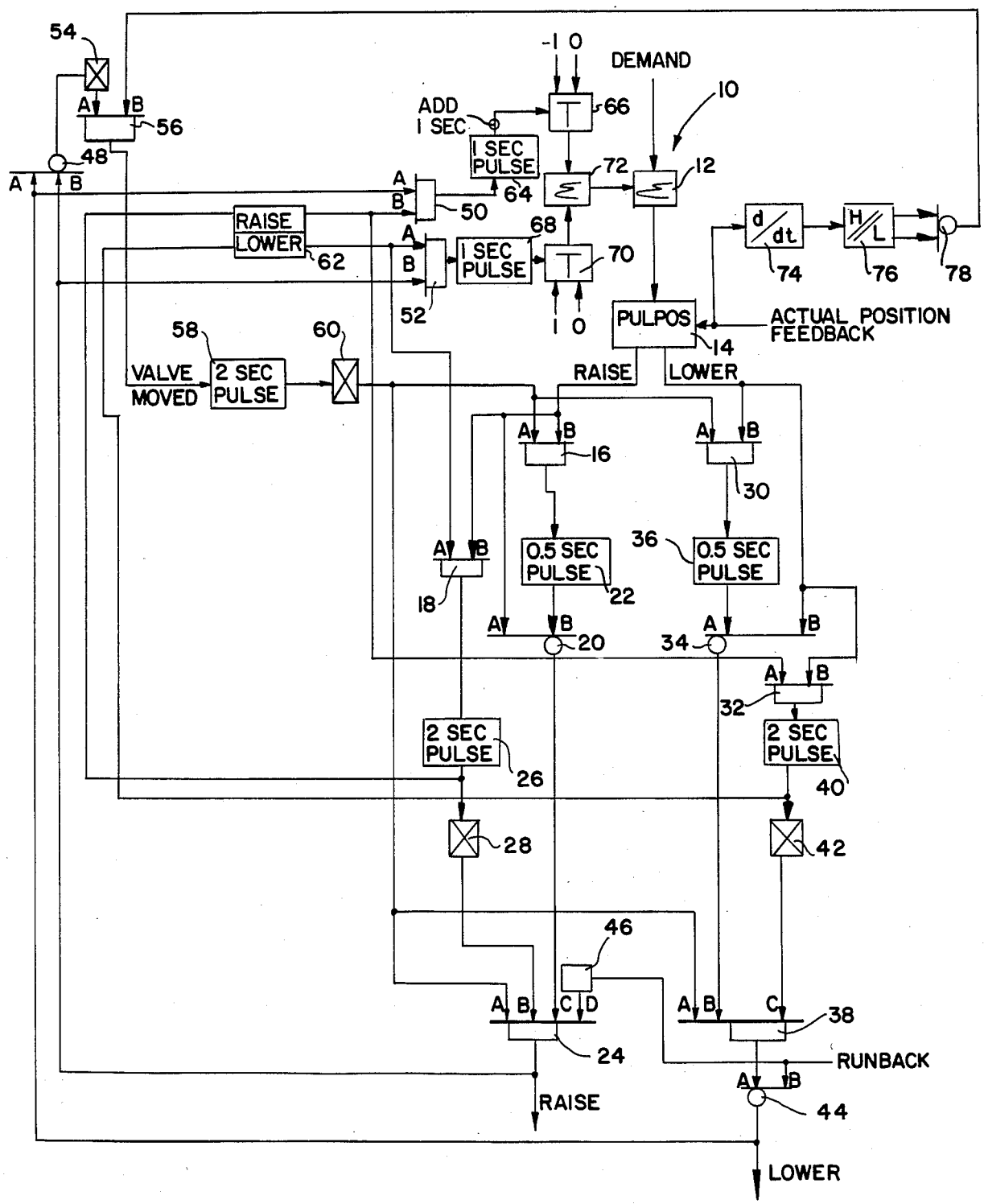

ADVANCED MOTOR CONTROLLER

TECHNICAL FIELD

The present invention relates generally to an electric motor controller, and more particularly to a controller which can be used for close positioning or modulating control of the motor.

BACKGROUND ART

Typically, close positioning or modulating control of electric motors requires the use of special start/stop or jogging equipment. In addition, because of the higher duty cycle, a non-standard motor having a higher temperature rating is usually required. Each attempt to start the motor generates heat within the motor, and repeated attempts will result in overheating and destruction of the motor if a standard motor is used. The use of such a non-standard motor having a higher insulation temperature rating significantly increases the overall cost of the system.

Most close positioning or modulating control systems also utilize a gear reducer on the output of the electric motor. Due to the inertia of the motor and gear reducer, the desired new position of the motor is "overshot", and the motor needs to be reversed in order to assume the proper position. Motor reversal may also be due to the need to establish a new position. This reversal requires a disproportionate motor movement due to gearing "backlash". Repeated energization or jogging to provide the fine tuning of the position also contributes to the overheating and destruction of the motor. Thus, the use of a non-standard motor in presently available close positioning or modulating control systems is imperative.

Because of the foregoing, it has become desirable to develop a controller for close positioning or modulating control of a motor which can be utilized with a motor having a standard insulation temperature rating without the possibility of overheating the motor during repeated close positioning of same.

SUMMARY OF THE INVENTION

The present invention solves the aforementioned problems associated with the prior art as well as other problems by providing an advanced controller for close positioning or modulating control of a motor. The controller is comprised of a logic circuit to provide the features desired. The controller compares a signal representative of the demand on the system with a signal representative of the actual position of the motor or a valve associated therewith, and if the difference between the foregoing signals is within an adjustable "deadband" no action is taken. If, however, the difference between these signals exceeds the adjustable "deadband" and no action has been taken within a previous time interval, a motor run pulse having a duration proportional to the foregoing difference is produced. If action had been taken during the previous time interval, a motor run pulse is not produced until the expiration of a predetermined period of time. If the motor or valve had last moved in a direction opposite to the direction of the new motor run pulse, a predetermined period of time is added to the new motor run pulse to compensate for gearing "backlash" which will occur during the reversal of motor rotation. If the new motor run pulse results in running the motor in the same direction, the motor run pulse will be output without modification. If the motor is already in operation and the new motor run pulse results in continued running in the same direction, the motor run pulse will be extended for the newly computed duration. However, if the new motor run pulse results in operating the motor in the opposite direction, the existing motor run pulse is immediately terminated to minimize over shooting the required position, and a predetermined period of time must elapse before the new motor run pulse is applied to the system. Through the use of the "deadband" concept, variable duration run pulse and the introduction of predetermined periods of time before certain motor run pulses are allowed to be generated, overheating of the motor is minimized and a standard electric motor can be utilized.

BRIEF DESCRIPTION OF THE DRAWING

The single FIGURE of the drawing is a schematic diagram of a system for controlling a motor or other positioning device.

DESCRIPTION OF THE PREFERRED EMBODIMENT

Referring now to the drawing where the illustration is for the purpose of describing the preferred embodiment of the present invention and is not intended to limit the invention hereto, the FIG. is a schematic diagram of a system 10 for controlling a motor or other positioning device. The system 10 is based upon the principal of comparing the actual position of a motor or valve associated with a motor with the desired position of same and, if the difference between the foregoing positions is within an adjustable "deadband", no action is taken. If, however, the difference between the foregoing positions exceed the "deadband", a motor control pulse is continuously produced until the difference between the foregoing positions are within the desired "deadband".

As such, a signal representative of the demand on the system is applied to an input of a summation function generator 12 whose output is connected to an input of a pulse position function generator 14. A signal representative of the actual position of the valve (feedback signal) is applied to another input of the pulse position function generator 14. The pulse position function generator 14 compares the signal representative of the demand on the system with the signal representative of the actual position of the valve (feedback signal), and if these signals differ by more than the adjustable "deadband", a signal to raise (further open) the valve or lower (further close) the valve is produced at the respective output of the pulse position function generator 14. The output of the pulse position function generator 14 associated with raising (further opening) the valve is connected to the B inputs of AND gates 16 and 18 and to the A input of an OR gate 20. The output of the AND gate 16 is connected to the input of a pulse generator 22 which establishes the minimum "on" duration of the raise (further open) output. The pulse generator 22 is connected to the B input of the OR gate 20. The output of the OR gate 20 is connected to the C input of an AND gate 24. The output of the AND gate 18 is connected to the input of a pulse generator 26 whose output is connected to the input of a NOT gate 28. The output of the NOT gate 28 is connected to the B input of the AND gate 24. The output of the pulse position function generator associated with lowering (further closing) the valve is connected to the B inputs of AND gates 30 and 32 and to the B input of an OR gate 34. The output of the AND gate 30 is connected to the input of a pulse generator 36 which establishes the minimum "on" duration of the lower (further closing) output. The pulse generator 36 is connected to the A input of the OR gate 34. The output of the OR gate 34 is connected to the B input of an AND gate 38. The output of the AND gate 32 is connected to the input of a pulse generator 40 whose output is connected to the input of a NOT gate 42. The output of the NOT gate 42 is connected to the C input of the AND gate 38. The output of the AND gate 38 is connected to the A input of an OR gate 44 which has a run back signal applied to the B input thereof. This run back signal is also applied to the input of a NOT gate 46 whose output is connected to the D input of AND gate 24. The output of the OR gate 44 is connected to the motor (not shown) and controls the lowering (further closing) of the valve associated therewith. Similarly, the output of the AND gate 24 is applied to the motor and controls the raising (further opening) of the valve associated therewith.

The output of the OR gate 44 is also connected to the A inputs of an OR gate 48 and of an AND gate 50. Similarly, the output of the AND gate 24 is connected to the B inputs of the OR gate 48 and of an AND gate 52. The output of the OR gate 48 is connected to the input of a NOT gate 54 whose output is connected to the A input of an AND gate 56. The output of the AND gate 56 is connected to the input of a pulse generator 58 whose output is connected to the input of a NOT gate 60. The output of the NOT gate 60 is connected to the A inputs of AND gates 16, 30, 24 and 38.

The outputs of the pulse generators 26 and 40 are also respectively connected to the raise and lower inputs of a set/reset memory 62 whose raise output is connected to the B input of AND gate 50 and to the A input of AND gate 32, and whose lower output is connected to the A inputs of AND gates 52 and 18. The output of the AND gate 50 is connected to the input of a pulse generator 64 whose output is connected to the input of a analog transfer function generator 66. The output of the AND gate 52 is connected to the input of a pulse generator 68 whose output is connected to the input of an analog transfer function generator 70. The outputs of the analog transfer function generators 66 and 70 are connected to the inputs of a summation function generator 72 whose output is connected to an input of the summation function generator 12.

The signal representative of the actual position of the valve (feedback signal) is also applied to the input of a differentiation function generator 74 whose output is connected to the input of a high//low function generator 76. The outputs of the function generator 76 are applied to the inputs of an OR gate 78 whose output is connected to the B input of AND gate 56.

Operationally, if the signal representative of the actual demand on the system exceeds the signal representative of the actual position of the valve by more than the adjustable "deadband", a digital 1 is produced by the pulse position function generator 14 at its "raise" output. This digital 1 is applied to the B inputs of AND gates 16 and 18 and the A input of OR gate 20. In addition, if the valve has not moved within a predetermined period of time, as established by the duration of the pulse produced by pulse generator 58, a digital 1 is applied to the A inputs of AND gates 16 and 24. Such a predetermined period of time for the duration of the pulse produced by pulse generator 58 could be approximately two seconds. The application of signals to inputs A and B of AND gate 16 causes it to conduct resulting in the actuation of pulse generator 22. Typically, pulse generator 22 produces a pulse of minimum duration such as 0.5 seconds resulting in a pulse of at least that duration being applied to input C of AND gate 24 via OR gate 20. In addition, if the valve last moved in the lower (further close) direction, a digital 1 is applied to the A input of AND gate 18 resulting in the pulse generator 26 producing a pulse for a predetermined period of time, such as two seconds. Thus, a digital 1 will not be received by the B input of AND gate 24 until after the pulse produced by pulse generator 26 has terminated. If more than two seconds have elapsed since the last movement of the valve, and if the last movement of the valve was in the lower (further close) direction and more than two seconds have elapsed since pulse position function generator 14 has produced a digital 1 at its "raise" output, then AND gate 24 is allowed to conduct resulting in the actuation of the motor and raising (further opening) of the valve associated therewith. The conduction of AND gate 24 causes a digital 1 to be applied to the B inputs of OR gate 48 and AND gate 52. If the last movement of the valve was in the lower (further close) direction, conduction by the AND gate 24 results in the conduction by AND gate 52 causing pulse generator 68 to produce a pulse of predetermined duration, such as one second. This one second pulse causes a +1 to be selected by the analog transfer function generator 70 and this additional value is added to the demand via the summation function blocks 72 and 12 to compensate for gearing "backlash" resulting from the motor being caused to rotate in the opposite direction.

Conversely, if the signal representative of system demand is less than the signal representative of the actual position of the valve (feedback signal) by more than the "deadband", a digital 1 is produced at the "lower" output of the pulse position function generator 14. This digital 1 is applied to the B inputs of AND gates 30 and 32 and to the B input of OR gate 34. If the pulse produced by pulse generator 58 has elapsed, a digital 1 is applied to the A inputs of AND gates 30 and 38. The application of both inputs to AND gate 30 causes it to conduct resulting in pulse generator 36 producing a minimum pulse, e.g., 0.5 seconds, to the B input of AND gate 38. In addition, if the valve last moved in the raise (further open) direction, a digital 1 is applied to the A input of AND gate 32 causing it to conduct resulting in pulse generator 40 producing a pulse having a predetermined duration, such as two seconds. Thus, a digital 1 will not be received at input C of the AND gate 38 until after the pulse produced by pulse generator 40 has terminated. If more than two seconds have elapsed since the last movement of the valve, and if the last movement of the valve was in the raise (further open) direction and more than two seconds have elapsed since pulse position function generator 14 has produced a digital 1 at its "lower" output, then AND gate 38 is allowed to conduct resulting in the conduction of OR gate 44 resulting in the actuation of the motor and the lowering (further closing) of the valve associated therewith. The conduction of OR gate 44 causes a digital 1 to be applied to the A inputs of OR gate 48 and AND gate 50. If the last movement of the valve was in the raise (further open) direction, AND gate 50 conducts causing pulse generator 64 to produce a pulse having a predetermined length, such as one second. This one second pulse causes a-1 to be selected by the analog transverse function generator 66 and this additional value is added by the summation function generators 72 and 12 to the demand to overcome the gearing "backlash" resulting from the motor being required to rotate in the opposite direction.

From the foregoing it is apparent that pulse generators 22 and 36 establish the minimum duration of the motor run pulse. Pulse generators 26 and 40 establish the minimum "off" time between motor reversals, i.e., running up to running down or running down to running up. Pulse generators 64 and 68 establish the additional running time for overcoming "backlash" by adding a value to the demand in the summation function generator 12 which results in longer "on" time of pulse position function generator 14. It should be noted the pulse position function generator 14 does not operate continuously but only once every cycle time. The calculated "on" time, if shorter than the cycle time, will cause the motor to run and then stop. A calculated "on" time longer than the cycle time will cause the motor to run into the next cycle time wherein a new "on" time will be calculated.

As previously stated, the signal representative of the actual position of the valve (feedback signal) is also applied to the differentiation function generator 74 which computes the rate of change of this signal. The computed rate of change is then applied to the high//low function generator 76 which produces an output signal if the rate of change is increasing faster than a first predetermined rate of change or is decreasing more rapidly than a second predetermined rate of change. This output signal causes OR gate 78 and AND gate 56 to conduct resulting in the actuation of pulse generator 58. The actuation of pulse generator 58, in turn, causes NOT gate 60 to apply a digital 0 to the A inputs of AND gates 24 and 38 causing these gates to cease conducting. If the valve is moving, as determined by OR gate 78, and no output pulse is being generated, as determined by OR gate 48 and NOT gate 54, then AND gate 56 will conduct causing pulse generator 58 to produce an output pulse. This condition occurs when an output (AND gate 24 or OR gate 44) is established (digital 1) and then goes to a digital 0. The motor actuation will cease but its rotation will not immediately cease resulting in pulse generator 58 producing an output pulse. This pulse passes through NOT gate 60 preventing conduction of AND gates 24 and 38, thus preventing any further rotation of the motor for the time period set by pulse generator 58. This action prevents too many pulses from being sent to the motor in too rapid succession preventing the overheating of same. Pulse generator 58 thus establishes a mandatory time delay between motor run pulses. The operation of the system 10 can be overridden by the application of a runback signal to input B of OR gate 44 thus permitting the lowering (further closing) of the valve during an emergency condition.

In summary, if the difference between the signal representative of demand and the signal representative of the actual position of the valve is within the "deadband", no action is taken. If, however, the "deadband" is exceeded, and the valve has just moved, no action can be taken until a predetermined period of time, e.g., two seconds, has elapsed. If, however, the "deadband" has been exceeded and the valve has not moved within a predetermined period of time, e.g., two seconds, a run pulse is delivered to the motor which controls the valve. A minimum motor run pulse of approximately 0.5 seconds is always produced when a motor run pulse has been calculated and established. If the valve last moved in a direction opposite to that presently desired, the motor run pulse is extended to overcome gearing "backlash". If a command to run the motor exists at the time a new command is produced and the new command results in operating the motor in the same direction, the motor command will be continued without interruption so as to minimize the number of motor starts and to provide the fastest response possible. Conversely, if the new command results in operating the motor in the opposite direction, the existing command is immediately terminated and a time period, e.g. two seconds, is entered into before the new command is allowed to be established. This minimizes overshoot of the required position of the valve and results in the fastest response time. Thus, the system 10 will effectively respond to all possible conditions.

Certain modifications and improvements will occur to those skilled in the art upon reading the foregoing. It should be understood that all such modifications and improvements have been deleted herein for the sake of conciseness and readability, but are properly within the scope of the following claims.

We claim:

1. A control device for close positioning or modulating control of a positioning device comprising means for comparing the actual position of the positioning device with the desired position of the positioning device, said comparing means producing an output signal when said actual position of the positioning device differs from said desired position of the positioning device by more than a predetermined value, and means responsive to said output signal produced by said comparing means, said output signal responsive means causing the positioning device to move toward said desired position if a first predetermined period of time has elapsed since the last movement of the positioning device and if a second predetermined period of time has elapsed if the last movement of the positioning device was in a direction opposite to that of said desired position of the positioning device, said output signal responsive means including means for increasing the period of time the positioning device is actuated if the last movement of the positioning device was in a direction opposite to that of said desired position of the positioning device.

2. The control device as defined in claim 1 wherein said output signal responsive means further includes means for actuating the positioning device for a minimum period of time, said minimum time period actuating means being operable upon the initiation of each output signal produced by said comparing means.

3. The control device as defined in claim 1 further including means for determining movement of the positioning device after said output signal from said comparing means has ceased, said movement determining means preventing further movement of the positioning device until said first predetermined period of time has elapsed.

4. The control device as defined in claim 1 further including means for overriding said output signal responsive means permitting the closing of the positioning device.

5. The control device as defined in claim 1 further including means for determining the rate of change of the position of the positioning device, said rate of change determining means preventing further movement of said positioning device for said first predetermined period of time if the rate of change of the position of the positioning device exceeds a predetermined level.

* * * * *